United States Patent [19]
Baird et al.

[11] Patent Number: 5,675,767
[45] Date of Patent: Oct. 7, 1997

[54] METHOD FOR VERIFICATION AND RESTORATION OF DIRECTORIES IN CPU SYSTEM MANAGED STORE

[75] Inventors: Robert Baird, San Jose, Calif.; Thomas Beretvas, Poughkeepsie, N.Y.; Gerald Parks Bozman, Oakland, N.J.; Richard Roland Guyette; Paul Hodges, both of San Jose, Calif.; Alexander Stafford Lett, Mahopac, N.Y.; James Joseph Myers, San Francisco, Calif.; William Harold Tetzlaff, Mount Kisco, N.Y.

[73] Assignee: International Business Machines Corporation, Armonk, N.Y.

[21] Appl. No.: 973,937

[22] Filed: Nov. 10, 1992

Related U.S. Application Data

[63] Continuation of Ser. No. 382,513, Jul. 19, 1989, abandoned.

[51] Int. Cl.[6] ................................................. G06F 12/16
[52] U.S. Cl. .......................... 395/483; 395/486; 395/489; 395/182.03
[58] Field of Search ................................ 395/400, 575, 395/483, 486, 489, 182.3; 365/200, 201; 371/10.1 T, 21.1, 21.2; 364/DIG. 1

[56] References Cited

U.S. PATENT DOCUMENTS

| | | | |
|---|---|---|---|
| 3,400,371 | 9/1968 | Amdahl et al. | 395/591 |
| 4,084,226 | 4/1978 | Anderson et al. | 395/416 |
| 4,092,732 | 5/1978 | Ouchi | 395/182.03 |
| 4,207,609 | 6/1980 | Luiz et al. | 395/858 |
| 4,394,733 | 7/1983 | Swenson | 395/403 |
| 4,419,725 | 12/1983 | George et al. | 395/416 |
| 4,750,106 | 6/1988 | Aiken | 395/182.03 |
| 4,751,639 | 6/1988 | Corcoran et al. | 395/182.09 |
| 4,819,154 | 4/1989 | Stiffler et al. | 395/182.18 |
| 5,027,316 | 6/1991 | Frantz et al. | 395/831 |
| 5,089,958 | 2/1992 | Horton et al. | 395/182.03 |

OTHER PUBLICATIONS

Fernandez et al, "Database Security and Integrity", The System Programming Series, copyright 1981 by Addison-Wesley Co., pp. 140–141.

*Primary Examiner*—Tod R. Swann
*Assistant Examiner*—J. Peikari
*Attorney, Agent, or Firm*—R. Bruce Brodie

[57] ABSTRACT

A method for dynamically detecting loss of map integrity in a form of system-managed storage (SMS). In SMS, maps are used to define access paths to data and to allocate and reallocate storage resources among applications running thereon. The method steps include incorporating as an indivisible part of an overwriting commmand the duplication of map information by appending a portion of it to each data block in store, and detecting loss of map integrity as a function of a comparison mismatch between the portion stored with a counterpart data block and the map upon each read/write access.

12 Claims, 5 Drawing Sheets

| DATA | SUFFIX | | |
|---|---|---|---|
| | IDENT | BLOCK # | EXTERNAL ADDRESS |
| | A | 1 | 1 |
| | B | 1 | 2 |
| | A | 2 | 3 |
| | B | 2 | 4 |
| | A | 4 | 5 |
| | B | 3 | 6 |
| | A | 3 | 7 |
| | B | 4 | 8 |
| | C | 1 | 9 |
| | C | 2 | 10 |

| SORTED SUFFIXES | IDENT | BLOCK # | EXTERNAL ADDRESS |
|---|---|---|---|
| | A | 1 | 1 |
| | A | 2 | 3 |
| | A | 3 | 7 |
| | A | 4 | 5 |
| | B | 1 | 2 |
| | B | 2 | 4 |
| | B | 3 | 6 |
| | B | 4 | 8 |
| | C | 1 | 9 |
| | C | 2 | 10 |

MAP

| A | 1,3,7,5 |
|---|---|
| B | 2,4,6,8 |
| C | 9,10 |

FIG. 5

METHOD FOR VERIFICATION AND RESTORATION OF DIRECTORIES IN CPU SYSTEM MANAGED STORE

This application is a continuation of application Ser. No. 07/382,513, filed Jul. 19, 1989 now abandoned.

FILED OF THE INVENTION

This invention relates to CPU system-managed storage (SMS) and, more particularly, to methods for assuring the integrity and the recoverability of objects and their access path constructs located therein.

DESCRIPTION OF RELATED ART

To provide an appreciation for this invention, the following paragraphs briefly describe aspects of the physical and logical organization of CPU and storage. This includes hierarchical staged storage, demand paging virtual storage, the role of maps, and prior art use of map and other data redundancy for verification and recovery purposes.

CPU and Staged Storage

Modern data processing machines comprise an instruction processor coupled to a hierarchically organized and least recently used (LRU) managed staged storage system containing software and data. The fastest, most rapidly accessed storage is positioned closest to the instruction processor. Also, it is placed at the top of the hierarchy. Progressively slower forms of storage, which have the bulk of the information written thereon, occupy the lower positions within the hierarchy.

Because storage costs increase dramatically with speed, many computer systems divide the physical storage subsystem into a number of performance levels. Some of these levels, such as DASD and tape, have been treated as peripheral I/O devices and are accessed over an asynchronous path. Other levels, such as RAM and cache, have been treated directly by system hardware and accessed over a synchronous path as part of internal storage.

The term "internal storage" specifies that portion of storage randomly addressable for single read or write transfers. In IBM systems, internal storage is byte addressable except for an extension ("expanded store"). Expanded store is randomly accessed on a block or page addressable (4096 bytes/block) basis. It is managed as an LRU real memory backed paging store. Lastly, "external storage" refers to that bulk portion of storage that is not randomly addressable and must be directly accessed as on DASD.

The internal store is deemed "synchronous" when a processor is busy while referencing internal store; whereas, if the data being sought resides in external store (beyond a point called the "I/O boundary"), a referencing processor will search for another task to perform instead of waiting. This task or process switching is disruptive in that a retrieval path must be established to the new data and the processing state of the prior task must be saved. When the retrieval from external storage has been completed, it is again necessary to switch the CPU back to the former process or task.

Demand Paging Virtual Storage "Virtual storage" is the addressing of a storage space much larger than that available in the internal storage of a CPU. It relies on locality of referencing in both space and time. That is, processes tend to reference storage in nonuniform, highly localized patterns. This makes it possible for a small amount of real storage to back a much larger amount of virtual storage. If the referenced data is not available in internal storage, then it is brought in from external storage.

In a virtual demand paging system, each process actively references some subset of its virtual pages. The capacity of the system to manage pages is measured in terms of an upper bound on the number of slots or "page frames". That is, the number of page frames is related to the amount of internal store set aside to support the page frames. If the sum of the subsets of pages referenced by processes exceeds the number of page frames, then faulting will occur. "Faulting" is a synonym for the requirement to access external storage since the referenced page was not resident in the LRU-managed internal store. A system in this state is said to be "paging".

Directories and Maps and the Prior Art Uses of Redundancy in Connection Therewith Applications running on a CPU view information as data. They supply identifiers to the SMS and rely upon the SMS by using maps to locate, organize, and retrieve the data blocks associated therewith. In relatively primitive storage management systems, such as those associated with personal computers and their operating systems, index maps point to the DASD location of text streams and other objects. If the map is defective, then the objects cannot be accessed. The defects may be due to either software, media defects, or read/write failures in the access paths. One solution is described by Aiken, U.S. Pat. 4,750,106, "Disk Volume Data Storage and Recovery Method", issued Jun. 7, 1988.

Aiken discloses the use of "shadowing" to remedy any defects as applied to DASD-based, tree-organized data set indices. First, the index or "map" is maintained on DASD as a dual copy located at a known offset from the first DASD copy. Second, upon detection of a "map" error, fine scanning by way of a leftmost leaf node scan of indices is invoked to aid location and recovery.

Parenthetically, the term "shadow" refers to the practice that when an updated object is first written to external store, the system does not overwrite the original object. Instead, the updated object is written elsewhere on external store and the counterpart directory is changed to point to the updated object. The old object is the "shadow" of the updated object. Disadvantageously, the shadow copy scheme destroys any physical clustering that may have previously existed in the data.

Where the CPU SMS is supporting the concurrent execution of processes and/or applications as a single-level addressable virtual store, then maps relating diverse levels of indirection abound. In this regard, one map might relate data identifiers provided by applications to virtual storage addresses. Another map might relate virtual storage addresses to addresses in either the internal or external storage, or both.

The term "storage map", for purposes of this invention, is broadly inclusive of any directory, index, list, table, or catalog which provides a concordance among at least any two of the following factors: data object identification, attributes, storage ID, storage or processing status, validity, and storage location.

Other Uses of Redundancy and Maps

Other prior art uses of redundancy with respect to storage maps are to be found in:

(1) Luiz et al., U.S. Pat. No. 4,207,609, "Method and Means for Path Independent Device Reservation and Reconnection in a Multi-CPU and Shared Device Access System", issued Jun. 10, 1980;

(2) Ouchi, U.S. Pat. No. 4,092,732, "System for Recovering Data Stored in Failed Memory Unit", issued May 30, 1978; and (3) Fernandez et al., "Database Security and Integrity", The System Programming Series, copyright 1981 by Addison-Wesley Publishing Co., pp. 140–141.

Luiz shows the use of redundant maps permitting hosts to establish paths to data over a shared storage control unit (IBM 3880).

Ouchi discloses the spreading of blocks from the same logical file across N−1 DASD and recording a parity block on the Nth DASD, which parity block is an XORing of the parity contents of the N−1 other blocks. Contents from any single inaccessible DASD can be recovered from an XOR of the parity blocks and blocks stored on the N−2 remaining accessible DASD.

Fernandez uses dual mapping between pages of memory and their locations on DASD to establish current and prior consistent information states of a page.

SUMMARY OF THE INVENTION

It is an object of this invention to devise methods for maintaining a consistent state of storage map integrity.

It is a related object that such methods ascertain when a CPU storage map has become corrupted and correlatively ensure recovery thereof to a prior state of consistency.

It is yet another related object that such methods identify or otherwise localize the source of corruptive information and prevent the spread of damage by early detection.

It is still another object that such methods exploit information redundancy to verify and recover the state of storage maps in a novel manner.

With regard to the above recited objects, it was unexpectedly observed that if each map entry were duplicated, appended to a counterpart data block as a suffix thereto, and written to store, then map integrity could be verified as part of each atomic read/write access by a comparison match between the suffix and the counterpart map entry. Map recovery would entail no more than building back from the suffixes of data blocks. Indeed, even the suffixes of deleted but not erased data blocks could be used.

Arguably, each duplicate of a map entry could either prefix or suffix its counterpart data block. However, it was further unexpectedly observed that if such were used as a prefix to a data block in a CPU having a single-level addressable (virtual) store such as the IBM System/38, the prefix would either be capacity limited as to the number of constituently different fields or its range to access over the entire virtual range. Also, validity checking codes would have no value since they necessarily suffix a subject bit string. Consequently, the suffix became the append mode of choice for the data block.

More particularly, the above objects are satisfied in a CPU-controlled, system-managed store (SMS) in which read and write access to data blocks occur by way of indivisible (atomic) operations, and further in which reference is made to a map defining a data block location and a description of the data.

The method for ensuring map integrity and satisfying said objects comprises the steps of: (a) duplicating a portion of map information pertinent to a data block, appending the duplicated portion to said data block, and writing both into nonvolatile SMS as an indivisible part thereof; (b) matching the portion stored with a counterpart data block and the portion resident in the map responsive to and forming an indivisible part of each read/write access; and (c) upon any comparison mismatch, reconstructing said map from the duplicated portions of the data blocks, said portions being limited to information having the same type as the map.

BRIEF DESCRIPTION OF THE DRAWING

FIG. 4 and FIG. 5 set out the general flow of map recovery using an illustrative example.

DESCRIPTION OF THE PREFERRED EMBODIMENT

The Host CPU Environment for Executing the Method of the Invention

The invention can be conveniently practiced in a general purpose computer such as an IBM/360 or 370 architected CPU having the IBM MVS operating system. An IBM/360 architected CPU is fully described in Amdahl et al., U.S. Pat. 3,400,371, "Data Processing System", issued Sep. 3, 1968.

An MVS operating system (OS) is set out in IBM publication GC28-1150, "MVS/Extended Architecture System Programming Library: System Macros and Facilities", Vol. 1. Details of standard MVS or other operating system services such as lock management, subsystem invocation by interrupt or monitor, and the posting and waiting of tasks is omitted. These OS services are believed well appreciated by those skilled in the art.

Map Entry and SUFFIX

Figure 1:
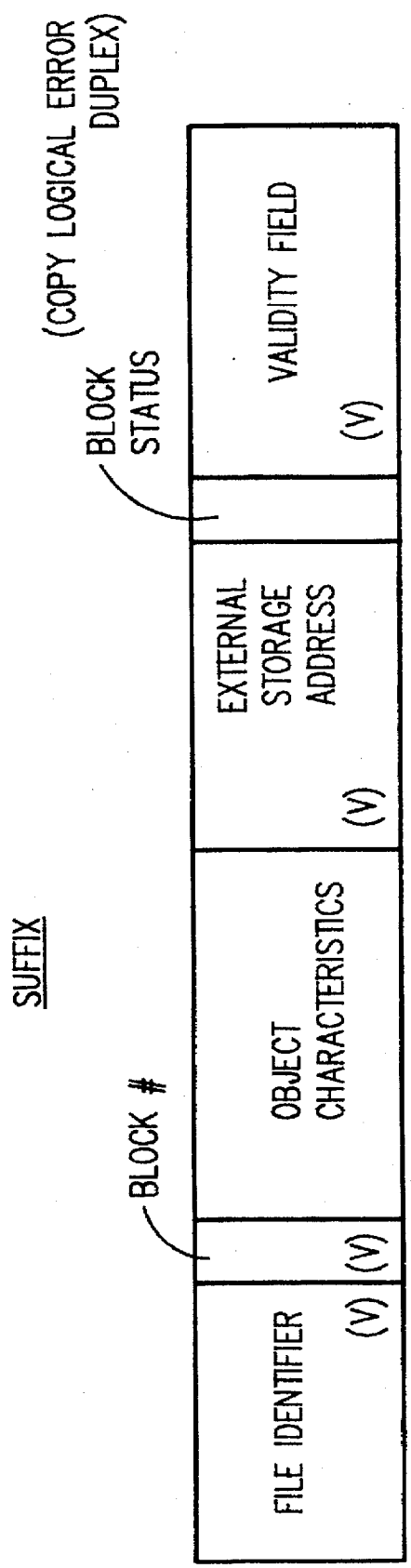
FIG. 1 depicts the general map fields constituting a SUFFIX and appending a counterpart data block.

Referring now to FIG. 1, there is shown a typical set of map fields associated with a data block or file and which also serve as a SUFFIX appending the block. These include an identifier, a block number, object characteristics, external storage address, block status, and validity checking fields.

The file identifier is supplied by the application. The block or page number is utilized by the demand paging virtual store for LRU management purposes. The object characteristics preferably include file length and type. The external storage address is the real address on DASD. Of course, SMS storage address (virtual or real or both) could very well be accommodated. The block status includes the number of times a block has been copied. Lastly, the validity checking fields include, for example, special codes such as alternating patterns (i.e., 1010 0101 0101 1010), any change in which being indicative of a failure in the hardware write path to DASD.

With regard to block status, suppose it were desired to update all the blocks in a file having the same copy number, and further suppose that the system crashed some time during the update operation. Copy operations may replicate corrupt information from one location to another as, for example, where the medium is defective to where the medium is passable. The copy count in the block status field would indicate the propagation extent.

Indivisible Commands

Indivisibility of the operations performed by each storage command ensures consistency of the SMS state. If a command is completed, then all the operations specified therein have been completed and a new SMS state exists. Otherwise, the command fails and the SMS state remains unchanged.

For purposes of this invention, the terms "data block" and "file" are synonomous. From the application view, a file is an abstract data type. That is, a file can be created, opened, written, rewound, read, closed, and deleted. The distinction between WRITE CREATE and other WRITE commands is that WRITE CREATE involves obtaining the fields constituting the map entry, duplicating them, appending the duplicated fields as a SUFFIX to the file or data block, and writing the block and the SUFFIX indivisibly to an address in external store.

Figure 2:
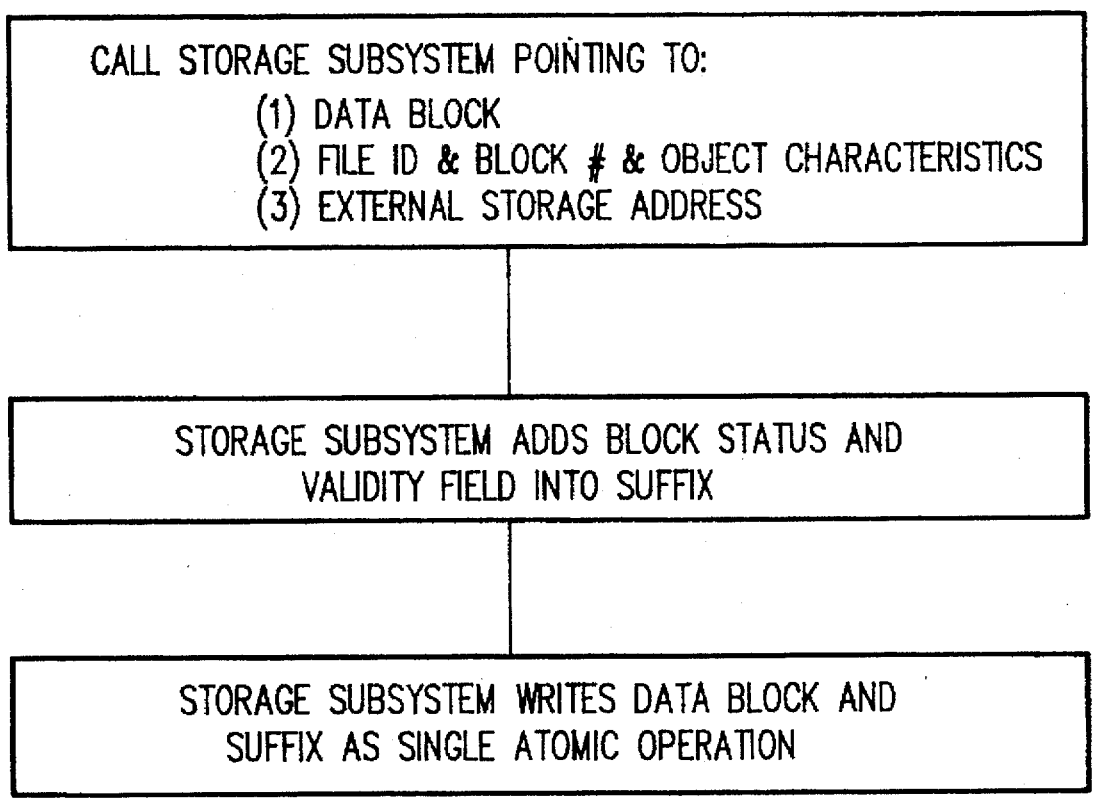
FIG. 2 shows the generic flow of a WRITE CREATE command indivisibly creating a data block, map entries, and appending a suffix thereto according to the invention.

Referring now to FIG. 2, there is shown a high-level flow of the WRITE CREATE command employed with this invention. The command consists of a CALL to SMS to obtain the SUFFIX fields constituting the file ID, block number, file or object characteristics, and address in external store. Typically, DASD subsystems such as the IBM 3880 Storage Control Unit and the IBM 3380 DASD provide by software means the SUFFIX fields of block status and validity checking bits. Last, the command WRITES the data block to external store as part of this indivisible command.

The significance of indivisibility of the command may be illustrated by the following example. Suppose the SUFFIX were not written as an indivisible part of the WRITE operation. This would permit the writing of the first block with corrupt information (the occurrence of a failure), and then recording of the SUFFIX. This means that an old SUFFIX would be associated with a defective block.

Figure 3:
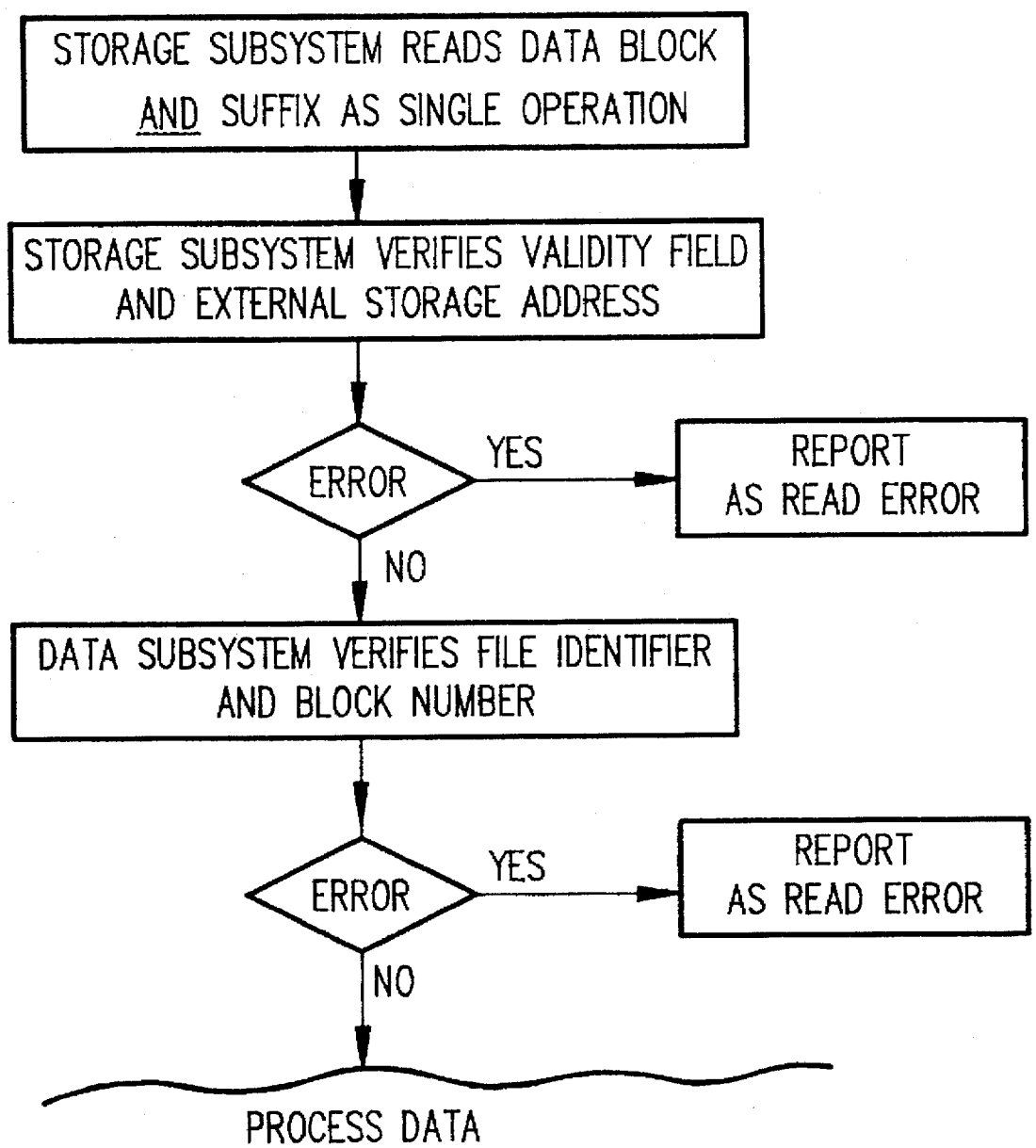
FIG. 3 expresses the generic flow of a READ/WRITE VERIFY command for matching the suffix appending an accessed data block with its counterpart map entry.

Referring now to FIG. 3, there is shown the generic flow of a READ/WRITE VERIFY command for matching the SUFFIX appending an accessed data block with its counterpart map entry. Significantly, the READ/WRITE VERIFY command requires SMS to read the data block and the SUFFIX as a single operation. Again, this is to avoid asynchronism between the SUFFIXES and data blocks. There next follows a series of comparison matches between fields of the SUFFIX and the counterpart fields of the map entry. Any mismatch is reported as a READ ERROR.

Since maps are the principal storage construct used to define access paths to and from data, their integrity is given priority. Emphasis is next placed on the map recovery operation.

In passing, it should be apparent that the fields in mismatch provide some indication as to the source of information corruption. For instance, invalid checking codes may be indicative of error in the SMS write path either because the CPU was not notified of the fault location and did not rewrite the block, or the CPU itself was faulty. Also, a mismatch in external store addresses suggests faulty DASD control directories. Although not previously discussed, each SMS utilizes a file or data block access method such as VSAM. A mismatch in the object or file attributes or identifiers may imply a file handler software error.

Full Map Recovery

Figure 4:
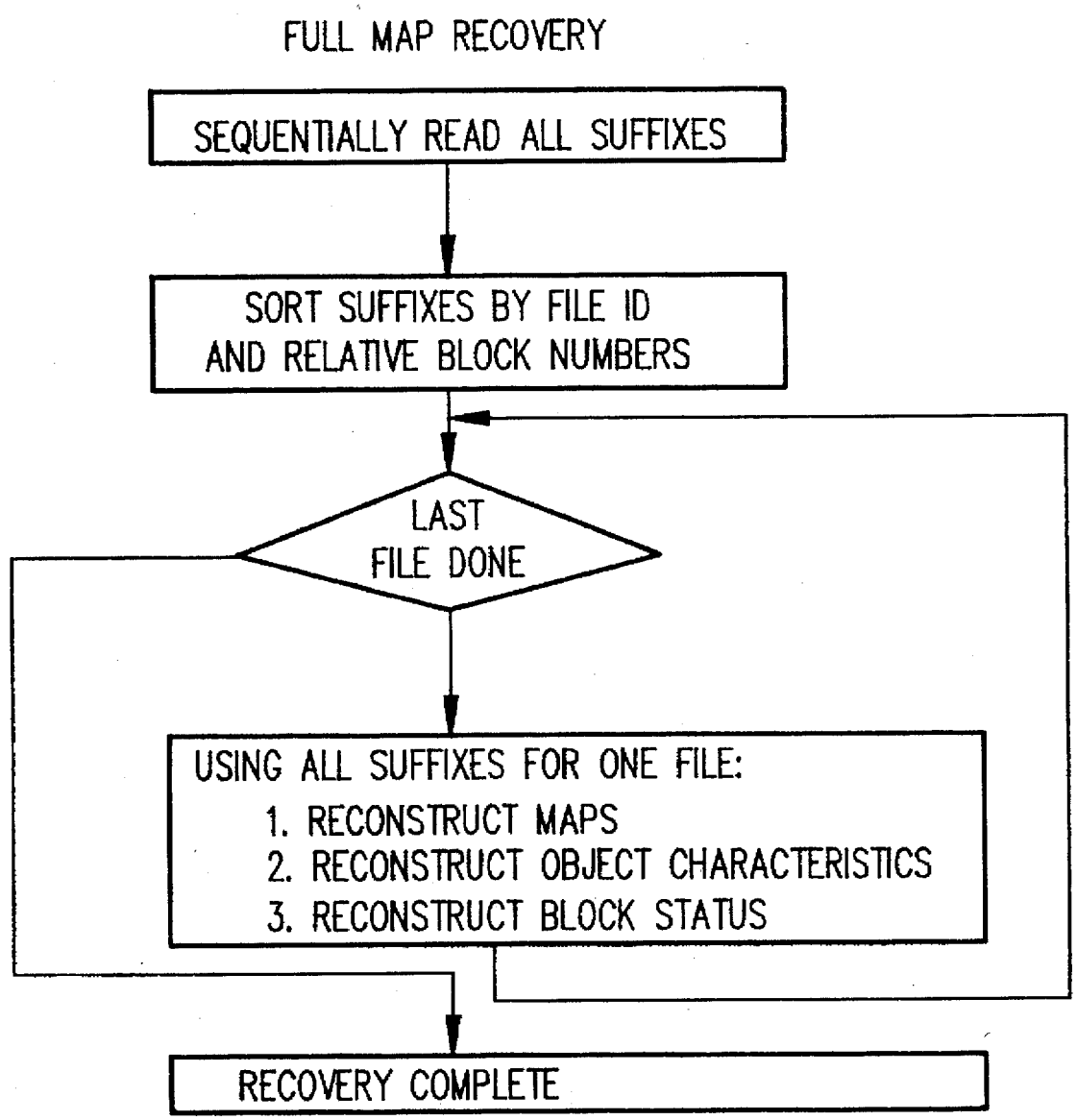

Referring now to FIGS. 4 and 5, there is set out the general flow of map recovery using an illustrative example. It should be recalled that the general object is to fully recover the map information. The assumption made is that between the map and the redundant map information dispersed about DASD as SUFFIXES to data blocks, the SUFFIXES are more likely to be accurate.

The fault or error model behind this assumption is that faults or errors tend to be bursty. That is, corrupt information tends to be a localized result of a physical process having a continuous but finite time duration. For example, such a description would fit defective DASD media and electromagnetically induced noise. Also, it should be noted that map references are made on nearly all operations affecting data. It follows that the statistics of corruption are higher with respect to maps than data stored in other parts of the SMS.

Referring again to FIG. 4, map recovery is initiated upon detection of a SUFFIX/map entry mismatch. First, all of the SUFFIXES must be acquired. A two-way sort is made thereon by file identity and relative block numbers. The primary sort is by the file ID, and the secondary sort is by the relative block number. Any sort package, such as IBM DFSORT Release 11, may be used. The sorted product of SUFFIXES represents the reconstructed map.

Nested faults do not pose a problem. If a fault occurs during the map recovery process, the process can merely be repeated since the rebuild is a replication and sorting of SUFFIXES in which their contents are not changed.

It should be recognized that there exists a tradeoff between SUFFIX space and recoverability. The larger the space, the higher the degree of map recoverability and fault localization. For instance, restricted space might require inclusion of an identifier but the omission of a field relating to the date the file or data block contents were last changed.

Referring now to FIG. 5, there is illustrated three information stages of map recovery. The top construct depicts data blocks and their appended SUFFIXES. Three SUFFIX fields are shown. These are file ID, relative block number, and external store address. In this example, they are shown resident in external store arranged in consecutive addresses 1–10. Note, each of the files may have more than one entry. That is, a file is partitioned into a number of blocks. Thus, files A and B are represented by counterpart block numbers 1–4, while file C has only two blocks.

The next construct sets forth the results of an n-way sort operation where n is the number of SUFFIX fields. More particularly, a two-way sort is shown in which the file ID is the primary index and the relative block number is the secondary index.

The last construct is the map setting forth the file ID and the external storage address of its counterpart blocks. With respect to entry A, the external addresses follow a nonsequential order, i.e., 1, 3, "7", 5. This results from the fact that blocks are assigned addresses randomly, and the map is secondarily ordered by relative block number and not by external storage address.

The rebuilt map represents the storage state of SMS as of its rebuild time. It may account for files deleted but not erased. However, the method cannot guarantee a 100 percent recovery. It relies upon the empirical high frequency of storage access and the fact that such access is close enough to fault occurrence that any consequential map corruption will be detected by SUFFIX/map mismatch.

Map recovery is enhanced if this method is used within an application or an SMS having log-based, forward and backward error recovery. It should be remembered that the focus of log-based recovery is to return the information state of application transactions to a prior state of consistency and not on recovery of SMS map constructs. Indeed, if the maps fail, such log-based recovery fails in the absence of the method of this invention.

This and other extensions of the invention may be made without departing from the spirit and scope thereof as recited in the appended claims.

We claim:

1. In a system having a central processing unit (CPU), a system managed store (SMS) for data blocks and at least one map defining each data block location and description of said block, and means responsive to applications executing on said CPU for reading and writing said data blocks and updating said map in the SMS by way of indivisible (atomic) operations, a method for ensuring integrity of said map comprising the steps of:

(a) duplicating a portion of the map pertinent to a data block, appending the duplicated portion to said data block, and writing both into a non-volatile segment of SMS as an indivisible part thereof;

(b) responsive to each read and write operation and forming an indivisible part thereof, matching the portion stored with the counterpart data block and the portion resident in the map; and (c) upon any comparison mismatch between the portions, reconstructing said map from a sorted subset of the duplicated portions of the data blocks, said portions being limited to information having the same type as the map.

2. The method according to claims 1, wherein the duplicated portion is appended to the data block as a SUFFIX thereto.

3. The method according claim 1, wherein said reading and writing means deletes data blocks by removing their counterpart map entries and erases data blocks by overwriting their SMS non-volatile locations, and further wherein said reconstructing step includes using the appended portions of deleted data blocks but not those of erased blocks.

4. A central processing unit (CPU) implemented method for dynamically detecting loss of map integrity in system managed storage (SMS), said maps being used to define access paths to data blocks located in SMS, said maps being a concordance of arbitrary block identifiers (names), block attributes, non-volatile SMS address, and other fields, CPU applications providing access path arguments in the form of the identifiers (names), said path arguments being used by said SMS to index said maps, comprising the steps of:

(a) responsive to an initial write access, indivisibly creating a map entry for a new data block, duplicating at least a portion of the entry and appending the duplicated portion to said new data block, and writing both into a non-volatile segment of SMS;

(b) responsive to each subsequent read access or each subsequent write access, indivisibly matching the portion of the map entry appended and stored with the accessed data block and the counterpart map entry or portion thereof, and providing indication upon any comparison mismatch; and (c) upon a mismatch, rebuilding said map or part thereof by rewriting the map or part thereof as a sorted subset of the entries appending each data block.

5. The method according to claim 4, wherein the duplicated portion is appended to each data block as a SUFFIX thereto.

6. The method according to claim 4, wherein the map entry and the duplicated portion of said entry as comparison matched in step (b) includes fields constituting a concordance between file and data block identifiers, virtual storage addresses in SMS, and non-volatile SMS addresses.

7. A method for ensuring verification and recovery of a central processing unit (CPU) based system managed store (SMS) from information corruption in maps, said maps defining the access paths between an application running on said CPU and data blocks located in the SMS, said SMS providing a virtual address interface between the application and the real storage within SMS, said maps including a first concordance between an application provided data block identifier and its virtual address, and, a second concordance between the virtual address and its real address in SMS, comprising the steps of:

(a) upon the initial writing of a data block to SMS, indivisibly executing the following substeps of making predetermined types of map entries, duplicating at least a portion of said entries, appending said duplicate portion to the data block as a SUFFIX, and recording both concurrently to SMS;

(b) responsive to each subsequent read or write access to the data block, indivisibly accessing said data block by way of a map defined path to a real storage address in SMS, and matching said SUFFIX of the accessed data block with the counterpart map entry; and (c) in the event of a mismatch, rebuilding said map or part thereof by rewriting the map using a sorted subset of the SUFFIXES of said data block or blocks.

8. The method according to claim 7, wherein said map entry and SUFFIX including at least a data block identifier communicated from an application executing on said CPU, an SMS address, validity checking codes, data block attributes, and other fields; and further wherein said method includes the step of localizing said source of map information corruption insofar as invalid checking codes being indicative of error in the SMS write path either because the CPU was either NOT notified of the fault location or the CPU itself was faulty.

9. The method according to claim 8, wherein said other fields includes a block status field in which the extent of replication of an object is maintained.

10. The method according to claim 7, wherein the rebuilding step includes the steps of replicating SUFFIXES and executing a an n-way sort among the n fields thereof.

11. The method according to claim 7, wherein the steps of duplicating at least a portion of a map entry, appending said duplicate portion to the data block as a SUFFIX, and recording both concurrently to SMS inclusively and indivisibly form steps within all write operations both at the time of data block creation in SMS and subsequently thereto.

12. The method according to any one of the claims 1, 4, or 7, wherein the inclusion of name and attribute fields in the SUFFIX permits recovery of a directory form of a map.

* * * * *